United States Patent

Ikeda et al.

[11] Patent Number: 6,096,393
[45] Date of Patent: Aug. 1, 2000

[54] POLYALLYL ALCOHOL GAS BARRIER MATERIAL

[75] Inventors: Kaoru Ikeda; Kazuyori Yoshimi; Yasuhiko Haneda, all of Kurashiki, Japan

[73] Assignee: Kuraray Co., Ltd., Kurashiki, Japan

[21] Appl. No.: 08/951,025

[22] Filed: Oct. 15, 1997

[30] Foreign Application Priority Data

Oct. 15, 1996 [JP] Japan ..................... 8-272250
Mar. 31, 1997 [JP] Japan ..................... 9-080919

[51] Int. Cl.$^7$ .......................... B29D 22/00; B32B 27/00; B32B 27/08
[52] U.S. Cl. .................. 428/34.7; 428/36.6; 428/36.7; 428/500; 428/515
[58] Field of Search ...................... 428/500, 515, 428/476.3, 483, 412, 517, 518, 424.2, 34.7, 35.5, 36.6, 36.7; 526/72, 328.5

[56] References Cited

U.S. PATENT DOCUMENTS

| | | | |
|---|---|---|---|
| 2,455,722 | 12/1948 | Adelson et al. | 260/80 |
| 2,467,105 | 4/1949 | Adelson et al. | 260/91.3 |
| 3,053,790 | 9/1962 | Lewis et al. | 260/30.8 |
| 3,285,897 | 11/1966 | Sullivan et al. | 260/91.3 |
| 3,666,740 | 5/1972 | Kargin et al. | 260/91.3 |
| 4,125,694 | 11/1978 | Blount | 526/47.7 |
| 4,215,028 | 7/1980 | Mizuguchi et al. | 260/29.6 TA |
| 4,423,196 | 12/1983 | Arit et al. | 526/72 |
| 5,369,188 | 11/1994 | Kim | 525/359.4 |

FOREIGN PATENT DOCUMENTS

| | | |
|---|---|---|
| 0 680 823 | 11/1995 | European Pat. Off. . |
| 52-108293 | 9/1977 | Japan . |
| 10-264318 | 3/1997 | Japan . |
| 854207 | 8/1958 | United Kingdom . |
| 9512624 | 5/1995 | WIPO . |

OTHER PUBLICATIONS

H. Lenk, et al.; C–NMR Relaxation and Circular Dichroism of Tactic Polymethallyalcohol and Polymethallylurethane; Polymer Bulletin 3, pp. 521–528 (1980).

*Primary Examiner*—Paul Thibodeau
*Assistant Examiner*—Kevin R. Kruer
*Attorney, Agent, or Firm*—Oblon, Spivak, McClelland, Maier & Neustadt, P.C.

[57] ABSTRACT

A gas barrier material having an oxygen permeability of not higher than 30 ml·20 $\mu$m/m$^2$·day·atm measured at 20° C., 100% RH, which comprises a polymer containing not less than 30 mol % of repeating units of formula (1):

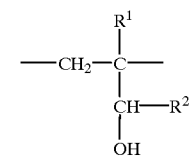

(1)

wherein $R^1$ is a $C_{1-2}$ alkyl group, and $R^2$ is hydrogen or a $C_{1-3}$ alkyl group.

This gas barrier material exhibits very good gas barrier properties under conditions of high humidity, and it possesses superior clarity and melt moldability.

21 Claims, No Drawings

POLYALLYL ALCOHOL GAS BARRIER MATERIAL

BACKGROUND OF THE INVENTION

1. Field of the Invention

The present invention relates to a gas barrier material having superior gas barrier properties under conditions of high humidity, and possessing high clarity and melt-moldability, and also to a multilayer structure comprising a layer of said gas barrier material.

2. Description of the Background

Foods and medicines are currently packaged with a gas barrier material made of polymers having good gas barrier properties to isolate contents from oxygen or any other gas. Examples of such polymers are vinyl alcohol polymer typified by ethylene-vinyl alcohol copolymer (occasionally referred to as EVOH hereinafter), vinylidene chloride polymer (occasionally referred to as PVDC hereinafter), and acrylonitrile polymer (occasionally referred to as PAN).

EVOH exhibits good gas barrier properties under conditions of low humidity and is capable of melt-molding, especially coextrusion molding with polyolefin. Unfortunately, its gas barrier properties deteriorate under conditions of high humidity and hence it is limited in application and form in which it is used. This holds true for containers (such as juice containers) which need flavor retention. In this application, EVOH usually constitutes the innermost layer and hence it does not exhibit barrier properties satisfactorily. To compensate for this, it is necessary to add an intermediate EVOH layer. This adds to the production cost. Moreover, EVOH lacks moisture barrier characteristics. This makes it necessary to use, in many applications, EVOH in the form of laminate in combination with a material (such as polyethylene and polypropylene) having comparatively good moisture barrier properties. There still are instances where EVOH cannot be used because of its inability to meet stringent requirements for moisture barrier properties.

As compared with EVOH, PVDC is less dependent on humidity for gas barrier properties and hence exhibits good gas barrier properties even under conditions of high humidity. In addition, it possesses superior moisture barrier characteristics. However, its thermal stability is so poor that melt molding is possible only when it is copolymerized with vinyl chloride or has plasticizers incorporated therein. Unfortunately, PVDC copolymer, which is capable of melt molding, is usually inferior to EVOH in gas barrier properties; therefore, in applications where good gas barrier properties are required, PVDC without copolymerization or a plasticizer is used in the form of coating on films by emulsion coating or solution coating. Coating is limited in thickness of the barrier layers and hence cannot be applied in applications where good gas barrier properties are required.

Another polymer known for good gas barrier properties is PAN homopolymer. Unfortunately, it possesses poor melt moldability, because of its very high melting point. On the other hand, PAN copolymer, which is capable of melt molding, is usually inferior to EVOH in gas barrier properties.

All of the above-mentioned three polymers, EVOH, PVDC, and PAN, suffer the disadvantage of deteriorating clarity (becoming turbid) in proportion to thickness. In addition, PVDC and PAN yellow upon exposure to light and heat at the time of melt molding.

It is known that these disadvantages can be alleviated by copolymerization, which, unfortunately, aggravates gas barrier properties. Therefore, what still remains unrealized is a desired gas barrier material, which exhibits good barrier properties, even under the conditions of high humidity, and which also exhibits superior clarity and melt moldability.

Polymers are also known, typified by polyallyl alcohol and polymethallyl alcohol, which are composed of repeating units of allyl alcohol. These polymers are produced by polymerization as disclosed in U.S. Pat. Nos. 2,455,722, 2,467,105, 3,285,897, 3,666,740 (Japanese Patent Publication No. 40308/1972), and 4125694, and U.K. Patent No. 854207.

Some of these disclosures mention the application of polyallyl alcohol, but mention nothing about the fact that it has extremely good gas barrier properties. For example, U.S. Pat. No. 4,125,694 merely enumerates such applications as "coating agents, adhesives, impregnants, molding powders, paints, varnishes, laminates, fillers, in dispersions, and as intermediates in resin production", but mentions nothing about applications which require a high degree of gas barrier properties. In addition, it neither mentions nor suggests the fact that the object of the present invention is not achieved by polyallyl alcohol (as a typical allyl alcohol polymer), but is achieved only in the case where $R^1$ in formula (1) infra, is not hydrogen, but rather is a specific alkyl group.

A polymer composed of vinyl alcohol monomer or allyl alcohol monomer is disclosed in Japanese Published Unsearched Application No. 508065/1996 (WO 95/12624), which is used as a packaging material, which exhibits an oxygen permeability lower than a certain value under conditions of high humidity. It also mentions that the allyl alcohol polymer should essentially be one which has a hydrogen atom as $R^1$ in formula (1) of the present application: however, it discloses nothing about a polymer which has a specific alkyl group in lieu of a hydrogen atom as R'. It further mentions that the polymer composed of the vinyl alcohol units is preferred to a polymer composed of allyl alcohol units. In fact, it merely illustrates an example in which the object of improving oxygen barrier properties under conditions of high humidity is achieved by partly acrylating the hydroxyl groups of EVOH with aromatic carboxylic acid. It is also entirely different from the present invention in the way the problems are addressed.

It is also noted that literature, such as Polymer Bulletin, 3(10), pp. 521–528, 1980, reports isotactic or syndiotactic polymethallyl alcohol. However, the reference neither mentions nor suggests whether it even has gas barrier properties.

As mentioned above, among conventional gas barrier materials, EVOH is superior in having both gas barrier properties and melt moldability. There still is a demand for further improvement in gas barrier properties of polymers in order to make it possible to reduce the thickness of the gas barrier layer, thereby reducing production costs, and to lessen the effect of thickness fluctuations. There is also a demand for expanding areas of application and product variety by improving gas barrier properties under conditions of high humidity, by improving moisture barrier properties, and by improving clarity.

SUMMARY OF THE INVENTION

Accordingly, one object of the present invention is to provide a gas barrier material which exhibits superior gas barrier properties under conditions of high humidity, clarity, and melt moldability, and which also provides a multilayer structure comprising a layer of the gas barrier material.

Briefly, this object and other objects of the present invention as hereinafter will become more readily apparent can be attained by a gas barrier material having an oxygen permeability of not higher than 30 ml·20 μm/m²·day·atm measured at 20° C., 100% RH, which comprises a polymer containing not less than 30 mol % of repeating units represented by formula (1):

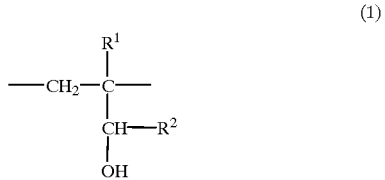

where $R^1$ is a $C_{1-2}$ alkyl group, and $R^2$ is a hydrogen atom or a $C_{1-3}$ alkyl group.

The polymer for the gas barrier material should preferably have an intrinsic viscosity of 0.1–3 dl/g measured in m-cresol at 30° C. The polymer should preferably be one which has a glass transition point of 45–95° C. measured in its absolute dry state and also has a glass transition point of not lower than 20° C. measured in its conditioned state at 20° C., 85% RH. Moreover, the gas barrier material should preferably have a moisture permeability of not higher than 30 g·30 μm/m²·day measured at 40° C., 90% RH, or it should have a saturated moisture absorption of 0.5–15 wt % measured at 20° C., 65% RH.

It is desirable that in formula (1) shown above, $R^1$ is $CH_3$ or $R^2$ is H. It is most desirable that in the formula (1) shown above, $R^1$ is $CH_3$ and $R^2$ is H. Moreover, the polymer should preferably have a stereostructure characterized by isotactic or syndiotactic units more than 60 mol % in triad terms.

Preferred embodiments of the present invention include a packaging material of the gas barrier material and a multilayer structure having at least one layer of the gas barrier material.

The multilayer structure may be a laminate comprising one layer of the gas barrier material and one or two layers of thermoplastic resin formed on one or both sides thereof. The thermoplastic resin should preferably be a polyolefin, polyamide, polyester, polycarbonate, polystyrene, polyvinyl chloride, or polyurethane.

In a preferred embodiment of the multilayer structure, the layer of gas barrier material has a thickness of 0.5–50 μm. Also, in a preferred embodiment of the multilayer structure, the layer of gas barrier material, which is 0.5–50 μm thick, is laminated with a film of at least one thermoplastic resin selected from the group consisting of a polyolefin, a polyamide, a polyester, a polycarbonate, a polystyrene, a polyvinyl chloride, and a polyurethane, at a total laminate thickness of 10–300 μm.

Another preferred embodiment includes a packaging container of the multilayer structure or laminated film.

DETAILED DESCRIPTION OF THE PREFERRED EMBODIMENTS

In formula (1) above, $R^1$ is a substituent group which is methyl or ethyl, with the former being preferred from the standpoint of gas barrier properties.

$R^2$ is a substituent group selected from the group consisting of hydrogen, methyl, ethyl, propyl, and isopropyl, with hydrogen being preferred from the standpoint of gas barrier properties.

If these substituent groups have a carbon number greater than that specified above, the resulting polymer will have a lower glass transition point than specified, which has an adverse effect on the gas barrier properties and leads to a decrease in stiffness. (Low stiffness impairs the bag making properties, if the gas barrier material is to be used in the form of film.)

According to the present invention, the polymer should contain repeating units of the above-mentioned structure in an amount of not less than 30 mol %, preferably in the range of 45–100 mol %, more preferably 70–100 mol %, and most desirably 80–100 mol %. At a content less than that specified above, the resulting gas barrier material exhibits poor gas barrier properties.

The polymer may contain more than one kind of repeating units of the above-mentioned structure having different $R^1$ and/or $R^2$. In this case, the content of structural units in the polymer is its total amount.

In addition to the repeating units of the above-mentioned structure, the polymer may contain comonomers in an amount not detrimental to the performance of the gas barrier material.

Examples of the comonomer include olefin monomers such as ethylene, propylene, 1-butene, isobutene, 1-pentene, 1-hexene, and 1-octene; diene monomers such as butadiene and isoprene; aromatic substituted vinyl monomers such as styrene and α-methylstyrene; acrylate monomers such as methyl acrylate, ethyl acrylate, butyl acrylate and methyl methacrylate; vinyl ether monomers such as methyl vinyl ether, ethyl vinyl ether, and butyl vinyl ether; vinyl halide monomers such as vinyl chloride and vinyl fluoride; vinylidene halide monomers such as vinylidene chloride and vinylidene fluoride; acrylonitrile monomers such as acrylonitrile and methacrylonitrile; and maleic acid derivatives such as maleimide, N-methylmaleimide, and dimethylmaleimide.

In the case where the polymer contains comonomers, copolymerization may be accomplished by random copolymerization or by alternating copolymerization, with the latter being preferred from the standpoint of gas barrier properties, if a large amount (more than 30 mol %) of comonomer is involved. In the latter case, the repeating units of formula (1) should preferably be present in an amount of 45–60 mol %.

The polymer product is not specifically limited with respect to stereospecificity; however, a syndiotactic or isotactic polymer is preferred because of its improved gas barrier properties. The content of syndiotactic or isotactic polymer should preferably be more than 60 mol %, more preferably more than 80 mol %, in terms of its triad content.

Since it is usually difficult or expensive to produce a polymer having a specific stereo regularity, a polymer of atactic structure is normally used in practice.

The polymer used for the gas barrier material of the present invention should preferably have an intrinsic viscosity in the range of 0.1–3 dl/g, more preferably 0.2–2 dl/g, and most desirably 0.3–1.5 dl/g, measured in m-cresol at 30° C. If the intrinsic viscosity is lower than as specified above, the resulting gas barrier material does not exhibit sufficient strength when used in the form of a film. If the intrinsic viscosity is higher than that specified above, the resulting gas barrier material presents difficulties in melt molding. (In this case the only possible way of making a film is by solution coating.)

Limiting the intrinsic viscosity to the above-mentioned range may be accomplished by controlling the degree of polymerization of the polymer or by copolymerizing it with a silicon-containing unsaturated monomer (such as vinylmethoxysilane), as disclosed in Japanese Patent Laid-open No. 144304/1985.

The polymer used for the gas barrier material of the present invention should preferably have a glass transition point of 45–95° C., more preferably 50–90° C., and most desirably 55–85° C., measured in its absolute dry state. The requirement is necessary for the gas barrier material to exhibit improved mechanical properties such as stiffness and tensile strength.

If the glass transition point is lower than that specified above, the resulting gas barrier material has poor stiffness. If the glass transition point is higher than that specified above, the resulting gas barrier material exhibits poor drop strength and impact resistance.

In addition, the polymer used for the gas barrier material should preferably have a glass transition point 20° C. or higher, more preferably 25° C. or higher, and most desirably 30° C. or higher, measured in its conditioned state at 20° C., 85% RH. This requirement is necessary for the gas barrier material to exhibit improved gas barrier properties under conditions of high humidity.

The gas barrier material of the present invention should preferably have a saturated moisture absorption of 0.5–15 wt %, more preferably 1.0–10 wt %, most preferably 1.5–6 wt %, measured at 20° C., 65% RH. This requirement is necessary for the gas barrier material to exhibit improved drop strength and impact resistance.

If the saturated moisture absorption is lower than that specified above, the gas barrier material exhibits poor drop strength and impact resistance. If the saturated moisture absorption is higher than that specified above, the gas barrier material is poor in stiffness and gas barrier properties.

There are several ways of limiting the polymer for the gas barrier material with respect to its glass transition point and/or a saturated moisture absorption as mentioned above. These ways include properly selecting $R^1$ and $R^2$ in the polymer, controlling the stereoregularity of the polymer, and copolymerizing the polymer with comonomer by random polymerization and/or alternating copolymerization. They may be used in combination with one another.

The gas barrier material of the present invention should have an oxygen permeability of 30 ml·20 $\mu$m/m$^2$·day·atm or lower, preferably 20 ml·20 $\mu$m/m$^2$·day·atm or lower, more preferably 10 ml·20 $\mu$m/m$^2$·day·atm or lower, and most desirably 5 ml·20 $\mu$m/m$^2$·day·atm or lower, measured at 20° C., 100% RH. Failure to meet this requirement results in a gas barrier material which cannot be used under conditions of high humidity.

The gas barrier material of the present invention should preferably have an oxygen permeability of 10 ml·20 $\mu$m/m$^2$·day·atm or lower, more preferably 5 ml·20 $\mu$m/m$^2$·day·atm or lower, much more preferably 2 ml·20 $\mu$m/m$^2$·day·atm or lower, and most desirably 1 ml·20 $\mu$m/m$^2$·day·atm or lower, measured at 20° C., 65% RH.

The gas barrier material of the present invention should preferably have a moisture permeability of 30 g·30 $\mu$m/m$^2$·day or lower, more preferably 20 g·30 $\mu$m/m$^2$·day or lower, and most desirably 10 g·30 $\mu$m/m$^2$·day or lower, measured at 40° C., 90% RH. A gas barrier material failing to meet this requirement may need to be laminated with a layer of low moisture permeability such as a polyolefin film, in some applications.

There are several ways of controlling the oxygen permeability and the moisture permeability as specified above. They include properly selecting $R^1$ and $R^2$ in formula (1) above of the polymer for the gas barrier material, controlling the stereoregularity of the polymer, copolymerizing monomer of formula (1) with an appropriate comonomer, and drawing (for orientation) the polymer of the gas barrier material.

The gas barrier material of the present invention exhibits good clarity. To be specific, it should preferably have a haze value (according to JIS K-7105) 2% or lower, more preferably 1.5% or lower, and most preferably 1% or lower, for any thickness of containers. This requirement is necessary for containers to make its contents clearly visible.

There are no specific restrictions on the method of producing the polymer used for the gas barrier material of the present invention. It is possible to use those methods which include the one mentioned in the discussion of the prior art. Three major methods are shown below.

First method:

Polymerization of monomer represented by formula (2) below, followed by reduction:

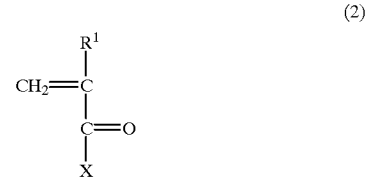

wherein $R^1$ is methyl or ethyl; and X is alkoxyl, hydroxyl, halogen, hydrogen, methyl, ethyl, propyl, or isopropyl.

Examples of the monomer include acrylic acids such as methacrylic acid and 2-ethylacrylic acid, acrylate esters such as methyl methacrylate and methyl 2-ethylacrylate, acroleins such as methacrolein and 2-ethylacrolein, and vinyl ketones such as isopropenyl methyl ketone, isopropenyl ethyl ketone, isopropenyl propyl ketone, and isopropenyl isopropyl ketone.

The above-mentioned monomer can be polymerized by any known method such as radical polymerization or anionic polymerization. Radical polymerization may employ an azo-based initiator or peroxide-based initiator. Examples of the former include 2,2'-azobisisobutyronitrile, 2,2'-azobis(2,4-dimethylvaleronitrile) and 2,2'-azobis(4-methoxy-2,4-dimethylvaleronitrile, and examples of the latter include isobutyl peroxide, di-n-propyl peroxydicarbonate, and t-butyl peroxypivalate. Polymerization may be carried out at any temperature, usually ranging from room temperature to about 100° C.

Anionic polymerization may employ an initiator which is an alkali metal or alkaline earth metal base such as butyl lithium, lithium aluminum hydride, methyl magnesium bromide, ethyl magnesium chloride, or triphenylmethyl calcium chloride. Anionic polymerization is usually carried out in an aprotic solvent such as tetrahydrofuran, dimethoxyethane, or diethyl ether at low temperature of from −100° C. to room temperature.

It is possible to produce either isotactic polymer or syndiotactic polymer as desired, if the above-mentioned polymerization conditions are properly selected. For example, polymerization of methyl methacrylate that employs, as an initiator, triphenylmethyl calcium chloride or bis(pentamethylcyclopentadienyl)samarium methyl yields syndiotactic polymethyl methacrylate. Likewise, polymerization of methyl methacrylate that employs, as an initiator, lithium aluminum hydride yields isotactic polymethyl methacrylate.

The polymer obtained as mentioned above is finally reduced with a metal hydride, which functions as a reducing agent, such as lithium aluminum hydride, sodium borohydride, lithium borohydride, and diborane, or hydrogenated by the aid of a transition metal catalyst such as ruthenium, rhodium, nickel, palladium, or platinum.

Reduction is carried out in a solvent such as tetrahydrofuran, N-methylmorpholine, dimethylacetamide, dimethylformamide, dimethylsulfoxide, dimethoxyethane, methanol, ethanol, and propanol, which is properly selected with consideration being given to the solubility of the polymer and its reactivity to a reducing agent.

Reduction is carried out over a temperature range of from room temperature to 200° C., preferably 50–150° C.

Incidentally, reduction gives rise to a reduced polymer having a controlled stereostructure, if reduction is performed on an isotactic polymer or syndiotactic polymer.

Second method:
Polymerization of allyl alcohol represented by formula (3) below.

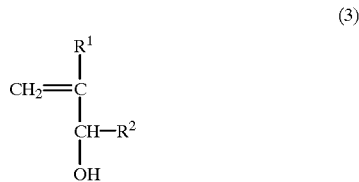

where $R^1$ is a $C_{1-2}$ alkyl group, and $R^2$ is hydrogen or a $C_{1-3}$ alkyl group.

Polymerization of the allyl alcohol shown above may be carried out in any manner, such as those disclosed in U.S. Pat. Nos. 3,285,897 and 3,666,740 (Japanese Patent Publication No. 40308/1972), and U.K. Patent No. 854207.

Third method:
Polymerization of an allyl halide derivative represented by formula (4) below, followed by conversion of the halogen atom into a hydroxyl group.

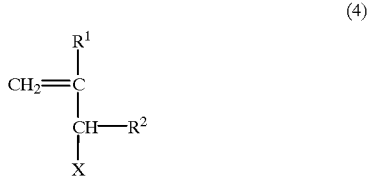

where $R^1$ is a $C_{1-2}$ alkyl group, $R^2$ is hydrogen or $C_{1-3}$ alkyl, and X is halogen.

An examples of the third method is disclosed in U.S. Pat. No. 4,125,694.

The gas barrier material of the present invention may be incorporated with any other thermoplastic resin in the gas barrier material in an amount not harmful to the gas barrier property. Examples of such thermoplastic resins are polyolefins such as polyethylene, polypropylene, polybutene, and polymethylpentene; polyesters such as polyethylene terephthalate and polybutylene terephthalate; polyamides such as polycaprolactam (nylon-6), polylauryl lactam (nylon-12), and polyhexamethylene adipamide (nylon-66); polystyrene, polyvinyl chloride, polycarbonate, polymethyl methacrylate, and polyurethane. They may be used in an amount normally less than 50 wt %.

The gas barrier material of the present invention may have incorporated therein a variety of additives in amounts which are detrimental to the gas barrier property, if necessary. Examples of additives include antioxidants, plasticizers, heat stabilizers, UV light absorbers, antistatic agents, slip agents, colorants, fillers, and polymeric compounds. Examples of each additive are given below as follows:

Antioxidants: 2,5-di-t-butylhydroquinone, 2,6-di-t-butyl-p-cresol, 4,4'-thiobis(6-t-butylphenol), 2,2'-methylene-bis-(4-methyl-6-t-butylphenol), 2,2'-methylene-bis-(4-methyl-6-t-butylphenol), octadecyl-3-(3',5'-di-t-butyl-4'-hydroxyphenyl)propionate, 4,4'-thiobis-(6-t-butylphenol), etc.

UV light absorbers: ethylene-2-cyano-3,3'-diphenyl acrylate, 2-(2'-hydroxy-5'-methylphenyl)benzotriazole, 2-(2'-hydroxy-5'-methylphenyl)benzotriazole, 2-(2'-hydroxy-5'-methylphenyl)benzotriazole, 2-(2'-hydroxy-3'-t-butyl-5'-methylphenyl)-5-chlorobenzotriazole, 2-hydroxy-4-methoxybenzophenone, 2,2'-di-hydroxy-4-methoxybenzophenone, etc.

Plasticizers: dimethyl phthalate, diethyl phthalate, dioctyl phthalate, wax, fluid paraffin, phosphate ester, etc.

Antistatic agents: pentaerythrytol monostearate, sorbitan monopalmitate, sulfated polyolefin, polyethylene oxide, carbowax, etc.

Slip agents: ethylene bis-stearoylamide, butyl stearate, metal salt of higher fatty acid, etc.

Colorants: carbon black, phthalocyanine, quinacridone, indoline, azoic pigment, red iron oxide, etc.

Fillers: glass fiber, asbestos, wollastonite, calcium silicate, mica, titanium oxide, calcium carbonate, silicon oxide, etc.

The term "gas barrier material", as used in the present invention, implies a material that is used for applications which require a high degree of gas barrier characteristics, especially under conditions of high humidity. To be specific, it is used for applications which require an oxygen permeability of 30 ml·20 $\mu$m/m$^2$·day·atm or lower measured at 20° C., 100% RH. It may be used in the form of containers for foods and medicines, which need protection against deterioration over a long period of time, pipes to convey some kinds of liquids, which are liable to oxidation, and gas bags to retain gas therein for a long period of time.

Of these applications requiring gas barrier properties, use as packaging material and packaging containers is most desirable for the gas barrier material of this invention because of its high degree of gas barrier characteristics. The packaging container may take on any shape such as bottles, cups, tanks, pouches, and bags, so long as they can be tightly sealed after filling.

The packaging containers way be filled with any contents. It will produce its marked effect when used for foods and medicines which need protection against deterioration over a long period of time. Use for food packaging is especially effective, in connection with the recent progress in food-packaging and food-transportation. Typical examples of foods are meats, seasonings, liquors, and beverages.

The term "gas barrier shaped article" implies any shaped article comprising the gas barrier material of the present invention so that it is suitable for applications which require bas barrier properties. The shaped article may take on any shape such as a film, sheet, pipe, bottle, cup, and tank, which is not specifically restricted.

Gas barrier shaped articles may be formed in any manner such as by melt molding, solution molding, and powder molding, none of which are particularly limited. The melt molding method consists of heating the gas barrier material above its melting point or softening point, thereby melting it and then forming the molten material. The solution molding method consists of dissolving the gas barrier material in a solvent and applying the solution to a substrate, followed by drying, or extruding the gas barrier material into a solvent which does not dissolve it. The powder molding method consists of heating powder in a mold or spraying powder onto a heated substrate.

Of these molding methods, melt molding is desirable because of its high productivity and adaptability to various shapes. The gas barrier material of the present invention is capable of melt molding with ease at almost the same temperature as ordinary thermoplastic resins.

The present gas barrier material may be used alone or in the form of laminate in combination with any other material according to individual applications. Because of its superior gas barrier properties, the present gas barrier material exhibits satisfactory gas barrier properties even when used in the form of thin film. In many instances, such thin films should preferably be used in the form of a laminated structure combined with any other material with respect to considerations of mechanical strength and economy. Examples of the material for lamination include polymers, especially thermoplastic resins, paper, and cloth, which are not specifically limited.

There are no specific restrictions on the layer structure of lamination with any other thermoplastic resin. If necessary, an adhesive interlayer may be interposed between the layer of the gas barrier material and the layer of the thermoplastic resin. The laminate may include one or more layers formed from recycled materials such as flash, trimmed edges, and defective products. Examples of the layer structure are shown below, wherein BAR is the layer of the gas barrier material of the present invention, A or B is the layer of any other thermoplastic resin, AD is the adhesive layer, and REG is a layer of recycled material. A/BAR, A/AD/BAR, A/BAR/A, A/BAR/B, A/AD/BAR/B, A/AD/BAR/AD/A, A/AD/BAR/AD/B, A/REG/AD/BAR/AD/REG/A, and A/AD/BAR/AD/BAR/AD/A.

According to a preferred multilayer structure, a layer of the present gas barrier material has its both sides covered with layers of the thermoplastic resin. In this case, an adhesive interlayer may be interposed between the two layers.

A preferred embodiment of the present invention is a laminate comprising a core layer of the present gas barrier material and outer layers on both sides. One outer layer is made of a thermoplastic resin whose melting point is higher than the glass transition point of the polymer constituting the gas barrier material measured in the completely dry state by at least 50° C., preferably at least 60° C., and more preferably at least 70° C. The other outer layer is made of a polyethylene resin having a density of not higher than 0.98 g/cm$^3$, preferably not higher than 0.95 g/cm$^3$, and more preferably not higher than 0.93 g/cm$^3$.

According to a preferred embodiment of the present invention, the layer of allyl alcohol polymer should have a thickness in the range of 0.1–50 μm, preferably 0.2–40 μm, more preferably 0.5–30 μm, and most preferably 1–25 μm.

At a thickness smaller than that specified above, the layer does not provide sufficient gas barrier properties. At a thickness larger than that specified above, the layer exhibits poor drop strength and impact resistance.

The present gas barrier material may be laminated with any resin. It is desirable to laminate one side or both sides of the layer of the gas barrier material with at least one kind of thermoplastic resin selected from the group of polyolefins, polyamides, polyesters, polycarbonates, polystyrenes, polyvinyl chlorides, and polyurethanes.

Examples of polyolefins include polyethylene, polypropylene, polybutene, polymethylpentene, and ethylene-propylene copolymer. Examples of polyamides include polycaprolactam (nylon-6), polylauryl lactam (nylon-12), and polyhexamethylene adipamide (nylon-66). Examples of polyesters include polyethylene terephthalate and polybutylene terephthalate. Examples of polystyrenes include polystyrene (GPPS), high-impact polystyrene (HIPS), styrenebutadiene copolymer (SB), and styrene-butadiene-acrylonitrile copolymer (ABS).

The multilayer structure of the present invention may take on a multilayer film as a preferred embodiment. In the present invention, film embraces sheet.

A preferred embodiment of the multilayer film of the present invention should have a total thickness of 10 μm or larger, preferably 30 μm or larger, and more preferably 50 μm or larger. It should also have a total thickness of 300 μm or smaller, preferably 250 μm or smaller, and more preferably 200 μm or smaller.

With a thickness smaller than specified above, the resulting multilayer film has poor stiffness and hence its ability to be made into bag is insufficient. It also has poor mechanical strength. At a thickness larger than specified above, the resulting multilayer film is too stiff for bag making and is uneconomical.

The multilayer structure should have an oxygen permeability of not higher than 30 ml/m$^2$·day·atm, preferably not higher than 20 ml/m$^2$·day·atm, more preferably not higher than 10 ml/m$^2$·day·atm, much more preferably not higher than 5 ml/m$^2$·day·atm, and most desirably not higher than 1 ml/m$^2$·day·atm, measured at 20° C., 65% RH. If this requirement is not met, the multilayer structure will not be used in applications where good gas barrier properties are needed.

The multilayer structure should have an oxygen permeability of not higher than 50 ml/m$^2$·day·atm, preferably not higher than 30 ml/m$^2$·day·atm, more preferably not higher than 20 ml/m$^2$·day·atm, much more preferably not higher than 10 ml/m$^2$·day·atm, and most desirably not higher than 1 ml/m$^2$·day·atm, measured at 20° C., 100% RH. If this requirement is not met, the multilayer structure can not be used in applications where good bas barrier properties are needed under conditions of high humidity.

There are several ways of controlling the oxygen permeability and moisture permeability as specified above. They include properly selecting $R^1$ and $R^2$ in formula (1) above for the polymer which constitutes the gas barrier material, controlling the stereo regularity of the polymer, copolymerizing the polymer with comonomer, controlling the thickness of the layer of the gas barrier material, and drawing (for orientation) the polymer constituting the gas barrier material.

There are no restrictions on the method of laminating the layer of the gas barrier material of the present invention with other polymers. Typical examples are coextrusion, coinjection, lamination, extrusion coating, and solution coating.

In the case of coextrusion, the layer of the gas barrier material may be combined with any one of the above-mentioned resins. However, if it is to be combined with a polyolefin, which has poor compatibility with the gas barrier material of the present invention, it is recommended to interpose an adhesive interlayer of a polyolefin modified with a monomer having a reactive or polar functional group such as maleic anhydride and acrylic acid between them. In the case of lamination with a polyester, polyamide, or polycarbonate, which are compatible with the gas barrier material, the adhesive interlay is not always necessary. A preferred molding temperature ranges from 150° C. to 300° C.

In the case of coinjection, the layer of the gas barrier material should preferably be combined with a layer of polyester, polyamide, or polycarbonate which exhibits good adhesion to the gas barrier material.

In the case of lamination, the layer of the gas barrier material may be laminated with any thermoplastic resin, which may be in the form of a biaxially-oriented film. For the present invention to produce its marked effect, it is recommended to employ dry lamination, single-layer extrusion lamination, or multi-layer extrusion lamination. In dry lamination, high bond strength is obtained by using an ordinary urethane adhesive for the adhesive interlayer. Extrusion lamination is accomplished by extrusion-coating the gas barrier material in the form of single layer or multiple layers with an adhesive layer on a substrate such as a film of polypropylene, polyethylene terephthalate, or polyamide or paper. A preferred adhesive for dry lamination or extrusion lamination is mentioned in "Lamination Handbook" (published by Kako Gijutsu Kenkyukai, Sep. 15, 1978).

In the case of solution coating, coating is accomplished by coating a polymer film or bottle with a solvent solution of the gas barrier material. Examples of the solvent include lower alcohols such as methanol, ethanol, 1-propanol, 2-propanol, and 2-methoxymethylethanol, and aprotic solvents such as dimethylformamide, dimethylacetamide, and dimethylsulfoxide. In the case of solution coating on a polyolefin film having poor compatibility, the film surface should be previously activated by an anchor coating or corona treatment. In the case of solution coating on a film of polyester, polyamide, or polycarbonate which has good compatibility, anchor coating or corona treatment may be optional.

The laminated film in the present invention is most suitable for use as a packaging container for foods to be protected by a gas barrier. Examples of foods include edible oils, processed edible fats and oils, processed meat, processed marine products, miso, pickles, seasoning, ketchup, mayonnaise, sauce, dressing, cheese, butter, jelly, curry roux, jam, soup, chimmi, confectioneries, tea, coffee, drinking water, spices, and liquors. The laminate is also used as packing containers for toiletry goods such as aromatics, tooth paste, and detergent, cosmetics, medicines, agricultural chemicals, industrial fats and oils, and industrial chemicals.

The containers are those which can hold contents and can be sealed. They may be in the form of pouches, bags, thermoformed containers such as vacuum formed containers and air-pressure formed containers, cups, trays, and bottles.

Having generally described this invention, a further understanding can be obtained by reference to certain specific examples which are provided herein for purposes of illustration only and are not intended to be limiting unless otherwise specified.

In the following examples, ratio and "%" are based on weight, unless otherwise stated.

The following methods were used for measurement and evaluation.

(1) Intrinsic viscosity:

Measured using an Ostwald viscometer. A sample is dissolved in an m-cresol solution at 30° C.

(2) Glass transition point and melting point:

Measured according to JIS K-7121 using a differential scanning calorimeter (DSC), Model RDC220/SSC5200H, made by Seiko Denshi Kogyo Co., Ltd. Indium and lead were used for temperature calculations.

The glass transition point in the absolute dry state is a value which is measured by heating a sample to 200° C. according to JIS-K7121, cooling it at a rate of 30° C./min to a temperature about 50° C. lower than the glass transition point, and heating it again at a rate of 10° C./min (2nd Run). The glass transition point in the conditioned state at 20° C. and 85% RH is a value measured by heating a sample at a rate of 10° C./min after its complete conditioning and immediate sealing in a pan (1st Run).

In the present invention, the glass transition point is the intermediate point glass transition temperature (Tmg) defined in JIS K-7121, and the melting point is the melting peak temperature (Tpm) defined in JIS K-7121.

(3) Saturated moisture absorption:

Calculated from $\{(Y-X)/Y\} \times 100$ (%), where X is a constant weight of a sample film of the gas barrier material measured after complete drying in a dryer at 80° C., and Y is a weight of a sample film measured after complete conditioning at 20° C. and 65% RH.

Incidentally, in the case of multilayer film containing a gas barrier layer, it is possible to measure the moisture absorption of the gas barrier layer in the same manner as mentioned above. However, in the case where the thermoplastic resin constituting the laminated film is hygroscopic, it is possible to calculate the moisture absorption of the gas barrier layer after measuring the moisture absorption of the thermoplastic resin.

(4) Oxygen permeability:

Measured according to JIS K-7126 (isobaric method) at 20° C. and 65% RH and at 20° C. and 100% RH, using an oxygen permeability measuring apparatus, Model MOCON OXTRAN 2/20, made by Modern Controls Inc. In this invention, the value of oxygen permeability is expressed in two ways. In one way, the oxygen permeability is expressed in terms of that for a 20 $\mu$m thick film (ml·20 $\mu$m/m$^2$·day·atm) which is calculated from the oxygen permeability of a single-layer film of arbitrary thickness (ml/m$^2$·day·atm). In another way, the oxygen permeability is expressed in terms of ml/m$^2$·day·atm without conversion. In the case of a multilayer film or a blow-molded container, the oxygen permeability is expressed in the latter way.

(5) Moisture permeability:

Measured according to JIS Z0208 at 40° C. and 90% RH and expressed in terms of g·30 $\mu$m/m$^2$·day after adjustment of the value for a thickness of 30 $\mu$m.

(6) Haze value:

Measured according to JIS K7105 using HR-100, made by Murakami Shikisai Kenkyusho, with sample film coated with silicone oil.

(7) Bag-making processability:

Sample film is made into three-side sealed pouches (150× 230 mm, 15 mm wide seal) at a seal-bar temperature of 180° C. using a high-speed bag-making machine, Model HSE-500A, made by Nishibe Kikai Co., Ltd. The bag-making speed is 85 bags/minute. The bags are examined for appearance (dart, pinhole, waving, whitening, and displaced seal) and seal strength, and are rated according to the following criterion.

A very good seal appearance and seal strength
B good seal appearance and seal strength
C slightly poor seal appearance and seal strength
D poor seal appearance and seal strength (8) Drop strength:

A sample of three-side sealed pouch is filled with miso (300 g), deaerated, and sealed at a seal bar temperature of 170° C., at a sealing width of 15 mm. After standing for 2·days at 20° C. and 65% RH, the filled pouch is dropped on a concrete floor from a height of 2.0 meters such that the pouch surface is parallel to the concrete floor. The sample pouch is examined for breakage and is rated according to the following criterion.
A very good, without damage
B good, with slight damage
C slightly poor, with damage although not broken
D poor with breakage (9) Appearance:

A sample of three-side sealed pouch is visually examined for appearance (gel fish-eye, steaks, woodgrain pattern, and discoloration) and clarity (or turbidity) and is rated according to the following criterion.
A very good appearance
B good appearance
C slightly poor appearance
D poor appearance

SYNTHESIS EXAMPLE 1

Synthesis of atactic polymethallyl alcohol (a-PMAAL):

A reactor equipped with a condenser was charged with 250 pbw of lithium aluminum hydride. With the atmosphere replaced by nitrogen, the reactor was charged with 3000 pbw of N-methyl morpholine, followed by refluxing at 130° C. To the reactor was added dropwise a solution containing 600 pbw of atactic polymethyl methacrylate in 6000 pbw of N-methyl morpholine, followed by refluxing for 4 hours. To deactivate unreacted hydride, 1000 pbw of ethyl acetate was added dropwise, and then 5000 pbw of 50% aqueous solution of phosphoric acid was added. After cooling, the supernatant liquid was centrifugally separated from solids. Distilled water was added to the separated supernatant liquid to cause the polymer (No. 1) to separate out. The thus obtained solids were dissolved in 10000 pbw of ethanol by heating at 60° C. for 1 hour. The solution was filtered through a glass filter. The filtrate was concentrated by an evaporator, and distilled water was added to cause the polymer (No. 2) to separate out. The thus obtained polymer samples (Nos. 1 and 2) were combined together and thoroughly washed in boiling distilled water (at 100° C.) After vacuum drying, there was obtained 380 pbw of a-PMAAL.

The a-PMAAL was found to have an intrinsic viscosity of 0.77 dl/g in m-cresol. It was also found to have a glass transition point of 75° C. measured with a differential scanning calorimeter (DSC) in such a manner that the sample was melted, cooled rapidly, and heated again at a rate of 10° C./minute under a nitrogen stream. There was no peak of crystal melting. The glass transition point measured after conditioning at 20° C. and 85% RH was 49° C. Physical properties of the A-PMAAL are shown in Table 1.

SYNTHESIS EXAMPLE 2

Synthesis of syndiotactic polymethallyl alcohol (s-PMAAL):

Synthesis was carried out in the same manner as described in Synthesis Example 1 except that the atactic polymethyl methacrylate was replaced by syndiotactic polymethyl methacrylate (with a tacticity of 80% in triad terms) which was obtained by polymerization at 0° C. in toluene by the aid of bis (pentamethylcyclopentadienyl) samarium methyl as an initiator. The resulting s-PMAAL was found to have a syndiotacticity of 80% in triad terms by $^{13}$C-NMR in DMSO-$d_6$. Physical properties of the S-PMAAL are shown in Table 1.

SYNTHESIS EXAMPLE 3

Synthesis of isotactic polymethallyl alcohol (i-PMAAL):

Synthesis was carried out in the same manner as described in Synthesis Example 1 except that the atactic polymethyl methacrylate was replaced by isotactic polymethyl methacrylate (with a tacticity of 93% in terms of triad) which was obtained by polymerization at −78° C. in diethyl ether by the aid of lithium aluminum hydride as an initiator. The resulting i-PMAAL was found to have a syndiotacticity of 90% in terms of triad by $^{13}$C-NMR in DMSO-$d_6$. Physical properties of the I-PMAAL are shown in Table 1.

SYNTHESIS EXAMPLE 4

Synthesis of atactic polyallyl alcohol (a-PAAL):

Synthesis was carried out in the same manner as described in Synthesis Example 1 except that the atactic polymethyl methacrylate was replaced by atactic polyethyl acrylate which was obtained by polymerization at 80° C. in toluene by the aid of azobisisobutyronitrile as an initiator. Physical properties of the a-PAAL are shown in Table 1.

SYNTHESIS EXAMPLE 5

Synthesis of styrene-methallyl alcohol random copolymer (ST-MAAL):

Synthesis was carried out in the same manner as described in Synthesis Example 1 except that the atactic polymethyl methacrylate was replaced by styrene-methyl methacrylate random copolymer (containing 75 mol % of styrene and 25 mol % of methyl methacrylate) which was obtained by polymerization at 80° C. in toluene by the aid of azobisisobutyronitrile as an initiator. Physical properties of the ST-MAAL are shown in Table 1.

EXAMPLE 1

The a-PMAAL obtained in Synthesis Example 1 was pelletized by melt extrusion at 220° C. using a laboplastomill (made by Toyo Seiki) equipped with a 20-mm twin-screw extruder. The pellets were formed into a single-layer film at a die temperature of 220° C. using a laboplastomill (made by Toyo Seiki) equipped with a 20-mm single-screw extruder and a coat-hanger die (300 mm wide, with a lip opening of 0.3 mm). Thus there was obtained a 20-μm thick film of a-PMAAL. This film was colorless and transparent and had a good appearance. The film was tested for saturated moisture absorption, oxygen permeability, moisture permeability, and haze. The results are shown in Table 1.

EXAMPLES 2 AND 3 AND COMPARATIVE EXAMPLES 1 AND 2

The same procedure as described in Example 1 was repeated except that the polymer obtained in Synthesis Example 1 was replaced respectively by those obtained in Synthesis Examples 2 to 5. The resulting film was tested in the same manner as described in Example 1. The results are shown in Table 1.

COMPARATIVE EXAMPLE 3

Ethylene-vinyl alcohol copolymer (having an ethylene content of 32 mol % and a degree of hydrolysis of 99.5%) was made into a single-layer film under the same conditions as described in Example 1. The resulting film was tested in the same manner as described in Example 1. The results are shown in Table 1.

COMPARATIVE EXAMPLE 4

Commercial biaxially-oriented polypropylene film (OPP, "Tocello OP U-1", 20 μm thick, having a melting point of 155° C., from Tocello Co., Ltd.) was evaluated in the same manner as described in Example 1.

TABLE 1

|  | Polymers | Intrinisic viscosity dl/g | Glass transition point (° C.) Absolutely dry | Glass transition point (° C.) 20° C., 85 % RH | Saturated moisture absorption % | Oxygen permeability*1) 65% RH | Oxygen permeability*1) 100% RH | Moisture permeability *2) | Haze % |
|---|---|---|---|---|---|---|---|---|---|
| Example 1 | a-PMAAL | 0.77 | 75 | 49 | 2.3 | 0.03 | 0.1 | 0.35 | 0.3 |
| Example 2 | s-PMAAL | 1.01 | 78 | 48 | 2 | 0.02 | 0.07 | 0.2 | 0.5 |
| Example 3 | i-PMAAL | 0.87 | 75 | 47 | 1.5 | 0.02 | 0.06 | 0.08 | 1 |
| Comparative Example 1 | a-PAAL | 0.92 | 64 | 25 | 8.5 | 0.6 | 110 | >100 | 0.4 |
| Comparative Example 2 | ST-MAAL | 0.95 | 90 | 85 | 0.7 | 80 | 80 | 20 | 0.4 |
| Comparative Example 3 | EVOH | — | — | — | 2 | 0.4 | 35 | 50 | 2 |
| Comparative Example 4 | OPP | — | — | — | 0 | 2100 | 2100 | 7 | 3 |

*1)ml· 20 μm/m².day.atm
*2)g· 30 μm/m² day

EXAMPLE 4

The film obtained in Example 1 was laminated (on both sides) with 50-μm thick low-density polyethylene (LDPE) film having a corona treated boding surface, with an interlayer of urethane adhesive between them. Thus there was obtained a laminate of the structure: LDPE/a-PMAAL/LDPE=50/20/50 μm Two pieces of the laminate, 10 cm square, were heat-sealed together in a nitrogen box, with 20 g of ketchup placed therein. The sample was allowed to stand at 40° C. and 50% RH for 180 days. No discoloration was observed in the ketchup.

COMPARATIVE EXAMPLE 5

Two pieces of low-density polyethylene film (50 μm thick, with corona treatment) were bonded together with an interlayer of urethane adhesive between them, thereby preparing a 100-μm thick laminate. This laminate was used for ketchup storage test in the same manner as described in Example 4. The ketchup turned black.

EXAMPLE 5

The a-PMAAL obtained in Synthesis Example 1 was pelletized by melt extrusion at 210° C. using a laboplastomill (made by Toyo Seiki) equipped with a 20-mm twin-screw extruder. The pellets were formed into a single-layer film at a die temperature of 210° C. using a laboplastomill (made by Toyo Seiki) equipped with a 20-mm single-screw extruder and a coat-hanger die (300 mm wide, with a lip opening of 0.3 mm), thereby preparing a 15-pm thick film of a-PMAAL. This polymer had very good processability. The resulting film was colorless and transparent and had a good appearance, i.e., no gelatin, fish-eye, streaks, and/or woodgrain pattern.

This film was laminated with a biaxially-oriented polypropylene film (OPP) by dry lamination to give a laminate film of OPP/a-PMAAL structure (with a total thickness of 35 μm). OPP is "Tocello OP U-1, 20 μm thick, having a melting point of 155° C., from Tocello Co., Ltd. Onto one side of this OPP was applied urethane-isocyanate adhesive ("Takerack A-385"/"Takenate A-10", from Takeda Chemical Industries. Ltd.) at a coating weight of 2.5 g/m² (on solid basis) .

The resulting laminate film was made into a pouch by sealing, with the a-PMAAL layer inside. The pouch was evaluated. The results are shown in Table 2.

EXAMPLE 6

The laminate film of OPP/a-PMAAL structure obtained in Example 5 was further laminated (on the a-PMAAL layer) with linear low-density polyethylene film (LLDPE, "Tocello TUX-TC", 65 μm thick, having a density of 0.92 g/cm³, from Tocello Co., Ltd.) by dry lamination in the same manner as described in Example 5, to give a laminate film of OPP/a-PMAAL/LLDPE structure (with a total thickness of 100 μm).

The resulting laminate film was made into a pouch by sealing, with the LLDPE layer inside. The pouch was evaluated. The results are shown in Table 2.

EXAMPLE 7

The same procedure as described in Example 6 was repeated except that the OPP was replaced by biaxially-oriented polyamide-6 film (ON, "Emblem ON #1500", 15 μm thick,—having a melting point of 220° C., from Unitika Ltd.) Thus there was obtained a laminate film of ON/a-PMAAL/LLDPE structure, with a total thickness of 95 μm. The resulting laminate film was made into a pouch by sealing, with the LLDPE layer inside. The pouch was evaluated. The results are shown in Table 2.

EXAMPLE 8

The same procedure as described in Example 5 was repeated except that the OPP was replaced by linear low-density polyethylene film (LLDPE, "Tocello TUX-TC", 65 μm, thick, having a density of 0.92 g/cm³, from Tocello Co., Ltd.) to give a laminate film of a-PMAAL/LLDPE structure (with a total thickness of 80 μm). The resulting laminate film was made into a pouch by sealing, with the LLDPE layer inside. The pouch was evaluated. The results are shown in Table 2.

EXAMPLE 9

The same procedure as described in Example 6 was repeated except that the a-PMAAL was replaced by the s-PMAAL obtained in Synthesis Example 2. Thus there was obtained a laminate film of OPP/s-PMAAL/LLDPE structure (with a total thickness of 100 μm). The resulting laminate film was made into a pouch by sealing, with the LLDPE layer inside. The pouch was evaluated. The results are shown in Table 2.

EXAMPLE 10

The same procedure as described in Example 6 was repeated except that the a-PMAAL was replaced by the i-PMAAL obtained in Synthesis Example 3. Thus there was obtained a laminate film of OPP/i-PMAAL/LLDPE structure (with a total thickness of 100 μm). The resulting laminate film was made into a pouch by sealing, with the LLDPE layer inside. The pouch was evaluated. The results are shown in Table 2.

EXAMPLE 11

The laminate film of OPP/a-PMAAL structure (obtained in Example 5) was laminated (on the a-PMAAL layer) with low-density polyethylene (LDPE, "Polyeti-LD LC500", 65 μm thick, having a density of 0.92 g/cm³, from Mitsubishi Chemical) by extrusion coating to give a laminate film of OPP/a-PMAAL/LDPE structure (with a total thickness of 100 μm). Prior to lamination, the a-PMAAL layer was coated with urethane-isocyanate primer adhesive ("Takerack A-503"/"Takenate CAT-10", from Takeda Chemical Industries, Ltd.) at a coating weight of 0.3 g/m² (on solid basis).

The resulting laminate film was made into a pouch by sealing, with the LDPE layer inside. The pouch was evaluated. The results are shown in Table 2.

EXAMPLE 12

The procedure of Example 6 was repeated to give a laminate film of OPET/a-PMAAL/LLDPE structure (with a total thickness of 92 μm), except that the OPP was replaced by biaxially oriented polyethylene terephthalate film (OPET, "Emblet PET-12, 12 μm thick, having a melting point of 260° C., from Unitika Ltd.).

The resulting laminate film was made into a pouch by sealing, with the LDPE layer inside. The pouch was evaluated. The results are shown in Table 2.

EXAMPLE 13

A four-layer laminate film was produced by coextrusion from the following materials using a feed-block type extruder.

copolyamide nylon-6/6, 6 (COPA, "Amiran CM6041", having a melting point of 200° C., from Toray Industries, Inc.)

adhesive polymer (AD, "Adomer, NF550", having a density of 0.91 g/cm³, from Mitsui Petrochemical Industries, Ltd.)

ionomer (IO, "Himiran 1652", having a density of 0.94 g/cm³, from Mitsui DuPont Chemical)

a-PMAAL obtained in Synthesis Example 1. Layer structure: COPA/a-PMAAL/AD/IO=20/15/10/95 μm total thickness=140 μm Extrusion temperature:

210° C. for a-PMAAL, 235° C. for COPA, 210° C. for AD and IO,

235° C. at feedblock, 230° C. at die.

These materials had very good processability. The resulting laminate film was colorless and transparent and had a good appearance and was free of gels, fish-eyes, streaks, and woodgrain pattern.

The laminate film was made into a pouch by sealing, with the IO layer inside. The pouch was evaluated. The results are shown in Table 2.

TABLE 2

| | Layer Structure (thickness) outer/inner (μm) | Oxygen permeability*[1] 65% RH | 100% RH | Bag-making processability | Drop strength | Appearance |
|---|---|---|---|---|---|---|
| Example 5 | OPP/a-PMAAL (20/15) | 0.04 | 0.15 | A | B | A |
| Example 6 | OPP/a-PMAAL/LLDPE (20/15/65) | 0.04 | 0.15 | A | A | A |
| Example 7 | ON/a-PMAAL/LLDPE (15/15/65) | 0.04 | 0.15 | A | A | A |
| Example 8 | a-PMAAL/LLDPE (15/65) | 0.04 | 0.15 | B | B | A |
| Example 9 | OPP/s-PMAAL/LLDPE (20/15/65) | 0.03 | 0.08 | A | A | A |
| Example 10 | OPP/i-PMAAL/LLDPE (20/15/65) | 0.02 | 0.06 | A | A | A |
| Example 11 | OPP/a-PMAAL/LLDPE (12/15/65) | 0.04 | 0.15 | A | A | A |
| Example 12 | OPET/a-PMAAL/LLDPE (12/15/65) | 0.04 | 0.15 | A | A | A |
| Example 13 | COPA/a-PMAAL/AD/IO (20/15/10/95) | 0.04 | 0.15 | B | A | A |

*[1] ml/m²·day·atm

EXAMPLE 14

A five-layer blow-molded container (350 ml capacity) was produced from the following materials using a direct blow molding machine, Model TB-ST-6P, made by Suzuki Tekkosho.

A-PMAAL obtained in Synthesis Example 1 (for interlayer)

polypropylene (PP, "B200" from Mitsui Petrochemical) for inner and outer layer maleic anhydride-modified polypropylene (M-PP, "Adomer QB540 from Mitsui Petrochemical) for adhesion layer Layer structure: (inner⇆outer)

PP/M-PP/a-PMAAL/M-PP/PP=320/10/10/10/350 μm total thickness=700 μm

Die temperature=220° C., mold temperature=25° C. Moldability and appearance were very good.

The resulting container was found to have an oxygen permeability of 0.06 ml/m²·day·atm at 20° C. and 65% RH and 0.2 ml/m²·day·atm at 20° C. and 100% RH.

The container was filled with miso (300 g), and the filled container was dropped on a concrete floor such that the bottom of the container is parallel to the concrete floor. The container remained intact, exhibiting high strength.

EXAMPLE 15

A three-layer blow-molded container (350 ml capacity) was produced from the following materials using a coinjection blow molding machine, Model ASB-50T, made by Nissei ASB Kikai Co., Ltd.

Polyethylene terephthalate (PET) having an intrinsic viscosity of 0.70 dl/g and a melting point of 255° C. a-PMAAL obtained in Synthesis Example 1 PET was charged into the primary injection molding machine whose barrel temperature was 285° C., and a-PMAAL was charged into the secondary injection molding machine whose barrel temperature was 225° C. The two materials were coinjected into a parison cavity controlled at 25° C. through the hot runner nozzle (280° C.) and gate. Thus there was obtained a multilayer parison composed of inner and outer layers of PET and an interlayer of a-PMAAL.

This parison was conditioned at 110° C. in a pot and then transferred to a blow mold. Immediately, the parison was stretched twice in the axial direction by using a stretching rod.

Simultaneously, the parison was stretched three times in the circumferential direction by compressed air (11 kg/cm$^2$), so that the parison conformed itself to the mold. After cooling, there was obtained a container which has the following layer body structure.

PET/a-PMAAL/PET=300/20/330 μm (outer⇆inner)

total thickness=650 μm Moldability, appearance, and clarity were very good.

The resulting container was found to have an oxygen permeability of 0.03 ml/m$^2$·day·atm at 20° C. and 65% RH and 0.10 ml/m$^2$·day·atm at 20° C. and 100% RH.

The container was filled with miso (300 g), and the filled container was dropped on a concrete floor such that the bottom of the container is parallel to the concrete floor. The container remained intact, exhibiting its high strength.

[Effect of the invention]

The gas barrier material of the present invention exhibits very good gas barrier properties under conditions of both low humidity and high humidity. It also possesses superior clarity and melt-moldability. It is useful as a material for a variety of shaped articles and containers.

The disclosures of priority Japanese Application Nos. 272250/1996 and 80919/1997 filed Oct. 15, 1996 and Mar. 31, 1997, respectively are hereby incorporated by reference into the present application.

Obviously, numerous modifications and variations of the present invention are possible in light of the above teachings. It is, therefore, to be understood that within the scope of the appended claims, the invention may be practiced otherwise than as specifically described herein.

What is claimed as new and is desired to be secured by Letters Patent of the United States is:

1. A packaging container formed of a gas barrier material having an oxygen permeability of not higher than 30 ml·20 μm/m$^2$·day·atm measured at 20° C., 100% RH, which consists of:

a polymer containing not less than 30 mol. % of repeating units of formula (1):

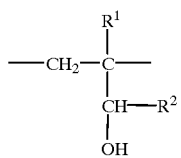

(1)

wherein R$^1$ is a C$_{1-2}$ alkyl group, and R$^2$ is hydrogen or a C$_{1-3}$ alkyl group, prepared in the form of a shaped article.

2. The packaging container as defined in claim 1, wherein said shaped article is a single layer of film.

3. The packaging container as defined in claim 1, wherein the polymer has an intrinsic viscosity of 0.1–3 dl/g measured at 30° C. in m-cresol.

4. The packaging container as defined in claim 1, wherein the polymer has a glass transition point of 45–95 ° C. measured in its absolutely dry state.

5. The packaging container as defined in claim 1, wherein the polymer has a glass transition point of not less than 20° C. measured in the conditioned state at 20° C., 85% RH.

6. The packaging container as defined in claim 1, wherein the gas barrier material has a moisture permeability of not higher than 30 g·30 μm/m$^2$·day measured at 40° C., 90% RH.

7. The packaging container as defined in claim 1, which has a saturated moisture absorption of 0.5–15 wt. % measured at 20° C., 65% RH.

8. The packaging container as defined in claim 1, wherein R$^1$ in formula (1) is CH$_3$.

9. The packaging container as defined in claim 1, wherein R$^2$ in formula (1) is H.

10. The packaging container as defined in claim 1, wherein R$^1$ in formula (1) is CH$_3$ and R$^2$ in formula (1) is H.

11. The packaging container as defined in claim 1, wherein the polymer has an isotactic or syndiotactic stereostructure of not less than 60 mol. % in triad terms.

12. A packaging container having a multilayer structure which comprises at least one layer of a gas barrier material having an oxygen permeability of not higher than 30 ml·20 μm/m$^2$·day·atm measured at 20° C., 100% RH, said gas barrier material comprising:

a polymer containing not less than 30 mol. % of repeating units of formula (1):

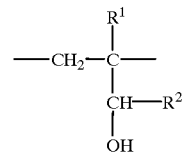

(1)

wherein R$^1$ is a C$_{1-2}$ alkyl group, and R$^2$ is hydrogen or a C$_{1-3}$ alkyl group.

13. The packaging container as defined in claim 12, wherein a layer of thermoplastic resin is laminated on one or both sides of a layer of the gas barrier material.

14. The packaging container as defined in claim 12, wherein a layer of at least one thermoplastic resin selected from the group consisting of polyolefin, polyamide, polyester, polycarbonate, polystyrene, polyvinyl chloride and polyurethane, is laminated on one or both sides of a layer of the gas barrier material.

15. The packaging container as defined in claim 12, wherein the layer of the gas barrier material has a thickness of 0.5–50 μm.

16. The packaging container as defined in claim 12, which comprises a multilayer film having a total thickness of 10–300 μm and having a layer of at least one thermoplastic resin selected from the group consisting of polyolefin, polyamide, polyester, polycarbonate, polystyrene, polyvinyl chloride and polyurethane, laminated on one or both sides of a layer of the gas barrier material, said layer of the gas barrier material having a thickness of 0.5–50 μm.

17. A multilayer structure which comprises at least one layer of a gas barrier material having an oxygen permeability of not higher than 30 ml·20 μm/m$^2$·day·atm measured at 20° C., 100% RH, which consists of:

a polymer containing not less than 30 mol. % of repeating units of formula (1):

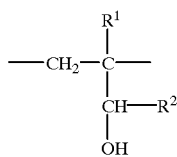

(1)

wherein $R^1$ is a $C_{1-2}$ alkyl group, and $R^2$ is hydrogen or a $C_{1-3}$ alkyl group.

18. The multilayer structure as defined in claim 17, wherein the layer of the gas barrier material has a thickness of 0.5–50 μm.

19. A multilayer structure having a layer of thermoplastic resin laminated on one or both sides of a layer of a gas barrier material having an oxygen permeability of not higher than 30 ml·20 μm/m²·day·atm measured at 20° C., 100% RH, which consists of:

a polymer containing not less than 30 mol. % of repeating units of formula (1):

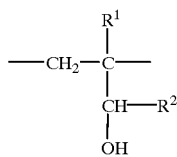

(1)

wherein $R^1$ is a $C_{1-2}$ alkyl group, and $R^2$ is hydrogen or a $C_{1-3}$ alkyl group.

20. A multilayer structure having a layer of at least one thermoplastic resin selected from the group consisting of polyolefin, polyamide, polyester, polycarbonate, polystyrene, polyvinyl chloride and polyurethane, laminated on one or both sides of a layer of a gas barrier material having an oxygen permeability of not higher than 30 ml·20 μm/m²·day·atm measured at 20° C., 100% RH, which consists of:

a polymer containing not less than 30 mol. % of repeating units of formula (1):

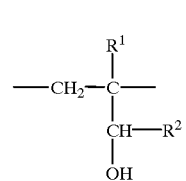

(1)

wherein $R^1$ is a $C_{1-2}$ alkyl group, and $R^2$ is hydrogen or a $C_{1-3}$ alkyl group.

21. A multilayer film with a total thickness of 10–300 μm, having a layer of at least one thermoplastic resin selected from the group consisting of polyolefin, polyamide, polyester, polycarbonate, polystyrene, polyvinyl chloride and polyurethane, laminated on one or both sides of a layer of a gas barrier material having an oxygen permeability of not higher than 30 ml·20 μm/m²·day·atm measured at 20° C., 100% RH, which consists of:

a polymer containing not less than 30 mol. % of repeating units of formula (1):

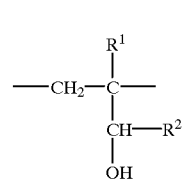

(1)

wherein $R^1$ is a $C_{1-2}$ alkyl group, and $R^2$ is hydrogen or a $C_{1-3}$ alkyl group, said layer of the gas barrier material having a thickness of 0.5–50 μm.

* * * * *